United States Patent

[11] 3,550,793

| [72] | Inventors | Martin A. Davidow<br>Bettendorf;<br>James T. Garner, Delmar, Iowa |
|---|---|---|
| [21] | Appl. No. | 777,624 |
| [22] | Filed | Nov. 21, 1968 |
| [45] | Patented | Dec. 29, 1970 |
| [73] | Assignee | J. I. Case Company<br>Racine, Wis.<br>a corporation of Wisconsin |

[54] MOUNTING MECHANISM FOR AUGER
10 Claims, 3 Drawing Figs.

[52] U.S. Cl. .................................................. 214/83.26,
198/64, 198/115, 214/83.32, 198/87
[51] Int. Cl. ..................................................... B60p 1/42
[50] Field of Search ............................................. 198/113,
114, 115, 64, 87, 99, 100; 193/14; 214/83.26,
83.32

[56] References Cited
UNITED STATES PATENTS

| 2,812,867 | 11/1957 | Anderson ..................... | 198/87X |
| 2,981,400 | 4/1961 | Rohweder ..................... | 198/64 |
| 3,085,675 | 4/1963 | Feiteira, Jr. ................. | 198/113 |
| 2,585,414 | 2/1952 | Steffens ....................... | 198/64 |

*Primary Examiner*—Albert J. Makay
*Attorney*—Settle, Batchelder & Oltman

ABSTRACT: A mounting mechanism for an unloading auger of a combine which pivotally supports one end of a first conveyor on a free end of a second conveyor. The mounting mechanism includes a hinge interconnecting one side of the adjacent ends of the conveyors and a pair of interconnected links having adjacent ends pivotally interconnected and free ends respectively pivotally connected to opposite sides of the respective conveyors with power means for moving the links between first and second positions, both of which define a locking mechanism for holding the conveyors in predetermined positions.

PATENTED DEC 29 1970　　　　　　　　　　　　　　　　3,550,793

INVENTORS
MARTIN A. DAVIDOW.
BY　JAMES T. GARNER.
SETTLE, BATCHELDER & OLTMAN.
ATT'YS.

INVENTORS.
MARTIN A. DAVIDOW.
BY  JAMES T. GARNER.
SETTLE, BATCHELDER & OLTMAN.
ATT'YS.

MOUNTING MECHANISM FOR AUGER

BACKGROUND OF THE INVENTION

The present invention relates generally to harvesting mechanisms, and more particularly to a mounting mechanism for supporting a movable conveyor section relative to a fixed conveyor section in either an operating or a transport position.

Generally speaking, harvesting machines, such as combines, typically include a tank which receives grain harvested by the harvesting machine. The tank normally has a fixed conveyor section disposed adjacent the lower end thereof which is in open communication with a second conveyor section or auger for conveying the harvested grain from the tank into a truck or other suitable type of transport or storage device.

Various types of connections have been proposed for interconnecting the respective conveyor sections for relative movement with respect to each other between a transport or storage position and an operating position. The relative movement between the two conveyor sections is normally accomplished by providing a hinge interconnecting the adjacent ends of the two conveyors with some type of mechanism for pivoting one auger section about the hinge from a storage position to an operating position. One type of mechanism which has been proposed is that disclosed in U.S. Pat. No. 2,585,414. Another type of mechanism for allowing relative movement between the respective conveyors is of the type disclosed in U.S. Pat. No. 2,783,907.

However, with the recent emphasis being placed upon automation in the field of harvesting mechanisms, there has developed a pressing need for a mounting mechanism for an unloading auger which is capable of being actuated from the operator's station of the harvesting machine and which is not capable of being accomplished by mechanisms known to applicant.

Another objectionable feature in the prior art type of mounting and supporting mechanism for the unloading auger has been that there is no specific provisions made for providing a simple and efficient positive type lock between the fixed conveyor and the relatively movable conveyor so that it is possible for the conveyors to move relative to each other during transportation, and/or during normal harvesting operations.

Of course this arrangement is very objectionable in that any possible relative movement between the conveyors during operation thereof may result in destruction of an entire conveyor section.

SUMMARY OF THE INVENTION

The present invention provides a mounting mechanism for a movable auger conveyor on a combine and in which the moving mechanism incorporates an automatic lock for maintaining the auger conveyor in either the operating position or the transport position. The locking mechanism for both positions is incorporated within the linkage mechanism so as to automatically lock the conveyor in the respective positions merely by producing the relative movement of the movable conveyor section to either of the transport or the operating position. This is accomplished by a unique linkage interconnection and a fluid motor for supplying the necessary power to the linkage section.

Thus, the primary object of the present invention is to provide a simple and efficient interconnection between a movable auger section and a fixed conveyor section which automatically locks the conveyor sections in either an operating position or a transport position.

Another object is to provide an improved mounting mechanism which includes a pair of pivotally interconnected links connecting sections of a conveyor which are movable between storage and operation positions and in which the pivotal connection between the links is disposed along a plane defined by the respective pivotal connections of the link to the conveyor sections in either of two positions so as to provide an automatic locking mechanism for the conveyor sections in either of two positions.

A further object of the present invention is to provide an improved mounting and moving mechanism for a pair of conveyor sections and which incorporates a remotely controlled power means for actuating the mechanism.

A still further object of the present invention is to provide a simple and efficient mounting and moving means for a pair of interconnected conveyor sections and in which the mounting and moving means automatically locks the conveyor sections in two predetermined positions merely by appropriate actuation of the power means associated therewith.

Other objects of this invention will appear in the following description and appended claims, reference being had to the accompanying drawings forming a part of this specification wherein like reference characters designate corresponding parts in the several views.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
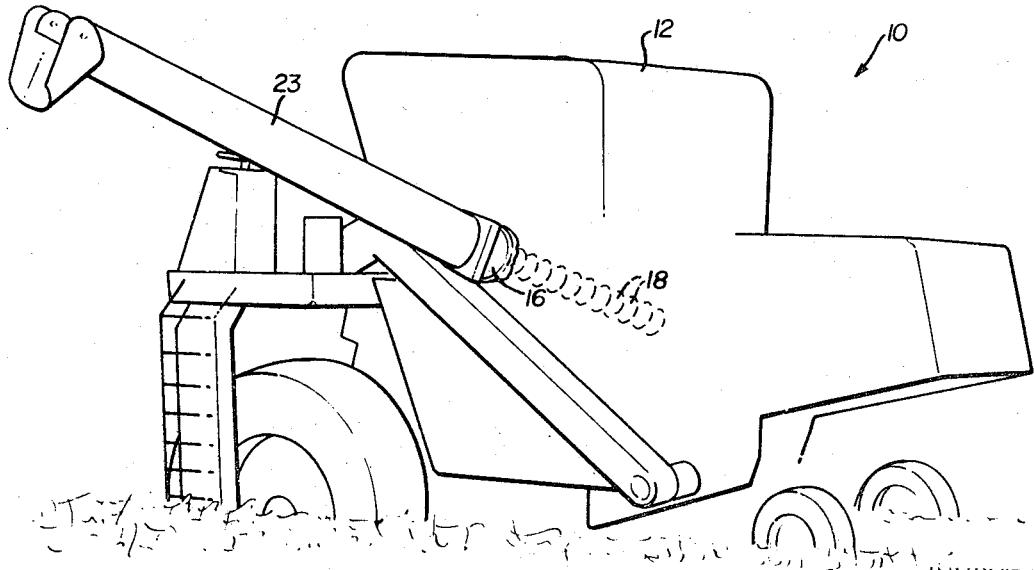
FIG. 1 is a perspective view of a harvesting machine, such as a combine, having the present invention incorporated therein.

FIG. 1 of the drawings generally discloses a harvesting machine, such as a combine, embodying the present invention. The harvesting machine 10 is of the general type and includes various elements which are capable of collecting harvested material from a field and separating the grain contained therein for deposit into a grain bin, generally designated by the reference numeral 12. The grain bin 12 conventionally includes a first conveyor or auger 14 which is generally disposed along the lower end of the grain bin 12 and extends transversely of the combine or harvesting machine to terminate in a free end adjacent one side of the tank 12. The conveyor 14 forming part of a discharge mechanism, generally includes a conveyor housing 16 and an auger section or flight 18 which is adapted to discharge harvested grain from the grain bin 12 into a suitable storage area (not shown).

Adjacent the free end of the conveyor section 14 is a second conveyor section or auger 22. In the illustrated embodiment, the auger section 22 is pivoted directly to the free end of the conveyor section 14 as will be explained hereinafter. However, the auger section may be inclined with respect to section 14 and have an elbow interposed therebetween.

The discharge chute or second conveyor 22 has its inner terminal end pivotally connected to the free end of the conveyor section 14 by hinge means which will now be described. In the illustrated embodiment, the hinge means or pivot axis 30 is defined by integral hinge sections or leaves 32 and 34 respectively formed on the adjacent side edges of the respective conveyors 14 and 22 with the hinge sections being pivotally interconnected by a pivot pin 36. As more clearly shown in FIG. 2, the hinge means or pivot axis is disposed laterally to one side or offset from the axis defined by the respective conveyor augers or flights. Of course, the respective leaves 32 and 34 are formed integral with or fixedly secured to reinforced portions 38 and 40 formed on the respective ends of the two conveyor sections and the portion 40 will be considered part of the frame of the combine.

Figure 2:
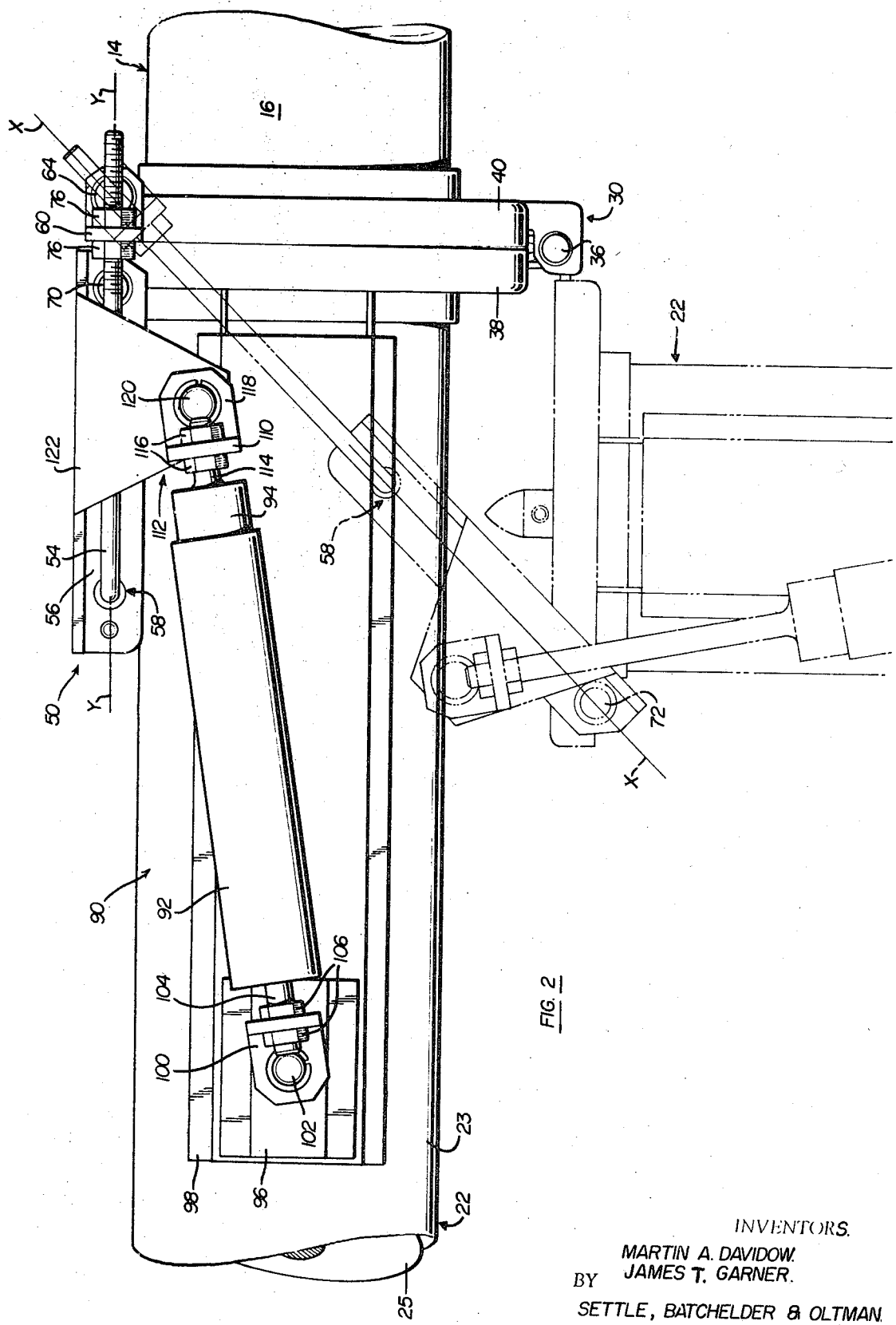
FIG. 2 is a plan view of a pair of auger sections interconnected in accordance with the present invention.

According to the present invention, means are provided for moving the conveyors between an operating position, shown in solid lines in FIG. 2, and a storage or transport position shown by the phantom lines of FIG. 2. The means for moving the conveyors or conveyor sections between the respective positions also incorporates means for automatically locking the conveyors in either of the two extreme positions.

Figure 3:
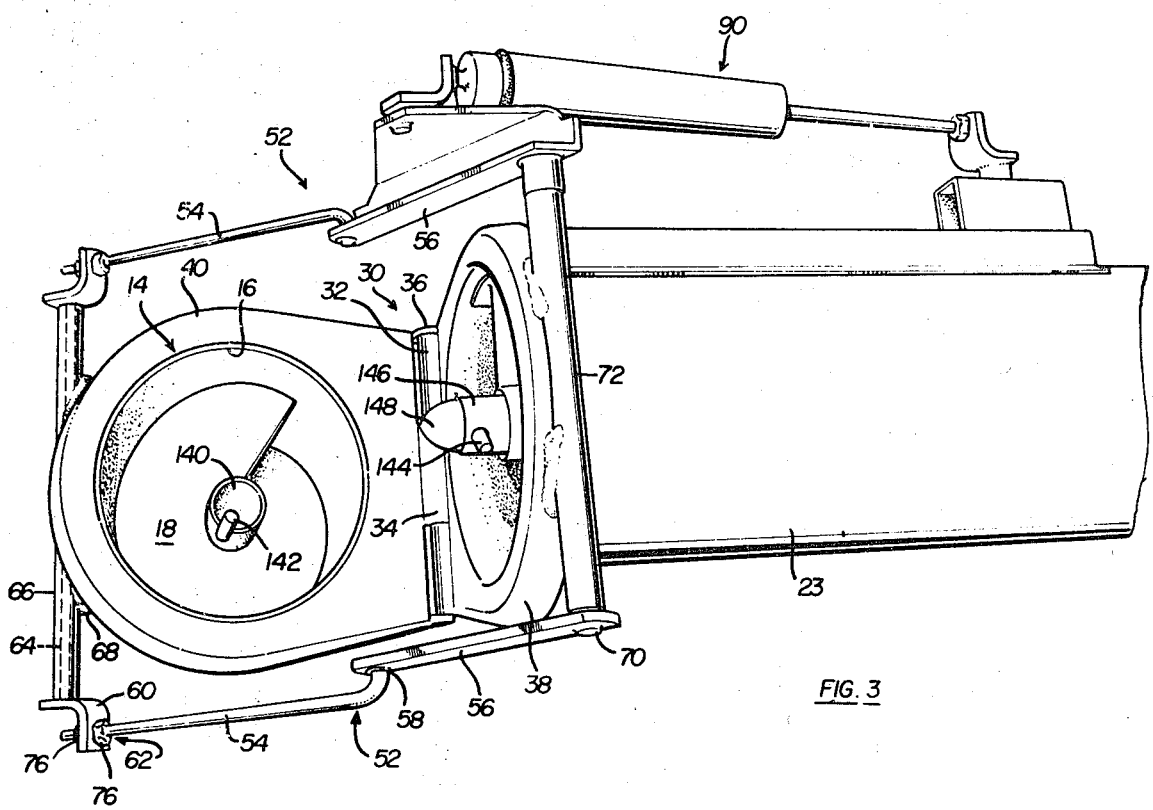
FIG. 3 is an enlarged perspective view of the conveyor sections in the open or transport position.

The mounting means 50 is more clearly shown in FIGS. 2 and 3 and includes first and second sets or pairs of links 52 respectively disposed above and below the axis defined by the respective conveyors. Each set of links 52 includes a first link 54 and a second link 56 having adjacent ends pivotally interconnected as at 58 to define a pivot axis intermediate the free ends of the respective links 54 and 56. The linkage means or mechanism has the free end thereof respectively pivotally connected to each of the conveyor sections. For this purpose, the free end of link 54 is connected to an angle bracket 60 by an adjustable connection 62, which will be described in more detail hereinafter. The free leg of the bracket 60 is fixedly secured in a suitable manner, as by welding, to a rod or pin 64 rotatably supported in a sleeve 66 fixedly secured as by welding 68 to the reinforcing flange 40 forming part of the housing 16 defining part of the conveyor 14.

The free end of the second link 56 is likewise fixedly secured to a pivot pin 70 rotatably supported in a tubular member 72 which again is fixedly secured as by welding to the reinforcing flange 38 and/or the housing 23 which forms part of the discharge conveyor or chute 22.

Of course, the opposite ends of the respective pins or rods 64 and 70 are likewise connected to each other by the second set of links 52 in a manner described in connection with the first set of links 52.

It should be noted that the adjustable connections 62 connecting the free ends of the first links 54, which is in the form of a rod, each include a pair of nuts 76 disposed on opposite sides of the downwardly depending leg of the bracket 60. It is readily apparent that appropriate turning of the nut 76 relative to the threaded rod 54 will increase or decrease the effective length of the link 54 between the pivots defined by pivot 58 and rod 64.

According to a further aspect of the present invention, the mounting means also incorporates means for moving the linkage or mechanism 52 between first and second positions, both of which define a locking mechanism for locking the respective conveyors in the two positions discussed hereinabove. The power means is in the form of a fluid motor 90 having relatively movable elements which in the illustrated embodiment are shown as a cylinder 92 having a piston rod 94 slidably supported therein.

The cylinder 92 is connected through a bracket 96 carried by a reinforcing bar 98 defined on the outer surface of the housing 23 forming part of the conveyor 22. The connection between the bracket 96 and the cylinder 92 includes an angle iron or bracket 100 pivotally supported on a pin 102 fixed on the bracket 96 with the second leg of the angle iron 100 being apertured to receive a threaded stud 104 extending from the free end of the cylinder 92. The threaded stud 104 is maintained in fixed relationship with respect to the angle iron 100 by nuts 106 disposed on opposite sides of the leg of the angle iron. Of course, the nuts provide an adjustable connection between the cylinder 92 and the bracket 96.

Likewise, the piston rod 94 is adjustably connected to one leg 110 of an angle iron 112 by a threaded stud 114 and nuts 116. The second leg 118 of the angle iron 112 is pivotally supported on a pin 120 extending above a plate 122 formed integral with and extending to one side of the link 56. An inspection of FIG. 2 shows that the pivot pin 120 is laterally offset from the longitudinal axis defined by the respective pivot axes located on the opposite ends of the link 56, for a purpose which will become apparent hereinafter.

In the operative position shown in the solid lines in FIG. 2, the respective auger flights 18 and 25 are interconnected so that the auger flight 18, driven by a power source (not shown), simultaneously drives the auger flight 25. For this purpose, the auger flight 18 has a recess or opening 140 defined on the end of the shaft defining the auger axis of auger 18 with a projecting pin 142 integral with the outer surface of the shaft defining the axis of the auger. A free end of the pin or drive lug 142 extends beyond the free end of the shaft and is adapted to engage a radially extending pin 144 extending transversely of the axis of the shaft 146 defining the auger axis for the auger flight 25. Also, the free end of the auger shaft 146 is tapered at 148 so as to be readily received into the recess or opening 140. Of course, it is readily apparent that movement of the second conveyor or discharge chute 22 from the position shown in FIG. 3 to the solid line position shown in FIG. 2 will cause the tapered pin 148 to be received into the recess or opening 140 and will locate the radially extending pin 144 in the path of the lug 142. Thus, rotation of the auger flight 18 will simultaneously cause a rotation of the auger flight 25.

OPERATION

The operation of the improved mounting and moving mechanism is believed to be apparent from the above description. With reference to FIG. 2 of the drawings, it can be seen that in the closed or solid line position shown therein, the links 54 and 56 are in essentially completely collapsed condition so as to locate the pivot axis for pivotal connections 58, 72 and 64 along a common plane defined by the line Y-Y. It should be noted that in this position the pivot axis 58 for the linkage mechanism 52 is disposed on one side and along a common plane defined by the lines Y-Y. Thus, the linkage mechanism will provide an automatic locking means for locking the two augers in the closed or operative position shown by the solid lines of FIG. 2.

It should also be noted at this point, that the adjustable connection 62 which connects the rod or link 54 to the pivot pin or pivot axis 64 will allow for adjusting the closing or locking pressure of the second auger or conveyor 22 with respect to the auger or conveyor 14. This can readily be appreciated by an inspection of FIG. 2 which shows that movement of the rod 54 along the axis defined by the line Y-Y will of course cause a corresponding movement of the pivot pin or axis 70 which in turn is supported on the conveyor 22. Movement of the pivot axis 70 towards the axis 64 will increase the force or pressure of engagement between the two conveyor sections.

Of course, if it is desired to move the conveyor 22 to the transport position which is normally disposed adjacent one side of the frame forming part of the combine and which is in a position approximately 90° from the operative position, it is only necessary to provide appropriate fluid pressure to the head end of the cylinder 92 through conduits (not shown) thereby causing an extension of the piston rod 94 to move the links 54 and 56 from the solid line position shown in FIG. 2 to the dotted line position shown therein. It should be noted at this point that the offset pivot pin 120 will define a moment arm about the main body of the link 56 to allow the fluid motor 90 to move the linkage from the solid line position or collapsed position to the dotted line or extended position also shown in FIG. 2.

Upon inspection of FIG. 2 and particularly the dotted line configuration thereof, it is again noted that the pivot axis 58 defined on the linkage mechanism 52 is disposed intermediate and along a plane defined by the pins or axes 64 and 70. Again, any forces applied to the linkage or linkages 52 will be applied to opposite ends thereof and the location of the pivot pin or axis 58 along the plane defined by the pivotal connection of the opposite ends of the linkage system will prevent any collapsing or relative movement of the links with respect to each other. Of course, this will result in the mounting mechanism or linkage system automatically locking the discharge chute or conveyor in the open or storage position shown by the dotted line of FIG. 2.

We claim:
1. In a material handling apparatus including a first conveyor housing having an outer terminal end, a second conveyor housing having an inner terminal end and normally positioned in end-to-end relationship to said first conveyor housing, and connecting means interconnecting the two housings for pivotal movement between first and second positions, the improvement of said connecting means comprising hinge means laterally offset to one side of said housings and pivotally interconnecting said housings, means defining first and second pivot axes laterally spaced from said hinge means and respectively defined on said first and second housings, linkage means interconnecting said first and second pivot axes, and comprising a collapsible link having a pivot defining a third pivot axis and an extendable link adapted to move said collapsible link between a collapsed and an extended position, said linkage means having a first self-locking position in the collapsed position of said collapsible link for locking said housings in said first position and a second self-locking position in the extended position of said collapsible link for locking said housings in said second position, said first, second and third pivot axis being aligned within a common plane in both said first and second locking positions.

2. A material handling apparatus as defined in claim 1 including the further improvement of said extendable link comprising fluid power means connected to said linkage means for moving said linkage means between said first and second positions.

3. A material handling apparatus as defined in claim 2, in which said fluid power means includes a fluid motor having relatively movable elements with one of said elements connected to said linkage means and the other of said elements connected to one of said housings.

4. In a combine or the like having a frame, an elongated discharge chute, and mounting means for connecting one end of said chute to said frame for pivotal movement about a pivot axis laterally offset from the axis of said discharge chute and between an outwardly projecting operating position and a transport position adjacent one side of said frame displaced approximately 90° about said axis from said operating position, the improvement of said mounting means comprising first and second links each having opposite ends, first pivot means pivotally interconnecting one end of said links, second and third pivot means respectively connecting the opposite ends of said links to said frame and said chute at points spaced from said pivot axis, said links having a first position wherein said first pivot means is disposed between and along a plane defined by said second and third pivot means to define a locking mechanism for locking said chute in one of said positions and a second position wherein said first pivot means is disposed to one side of said second and third pivot means and along a plane defined by said second and third pivot means to define a locking mechanism for locking said chute in the other of said positions, and power means for moving said links between said first and second positions.

5. A harvesting mechanism as defined in claim 4, and wherein the other of said positions of said chute is the operating position and wherein said links in said second position exert a locking pressure between said frame and said chute, the further improvement of means for adjusting the effective length of one of said links whereby to vary said locking pressure.

6. A harvesting mechanism as defined in claim 4, including the further improvement of said power means comprising a fluid ram having relatively movable elements with one of said elements pivotally connected to said chute and the other of said elements pivotally connected to one of said links at a point laterally offset from the pivotal connections at opposite ends thereof.

7. In a material handling apparatus comprising first and second conveyors having conveyor axes, a hinge laterally offset from said axes and pivotally interconnecting adjacent ends of said conveyors for movement between a first position wherein said conveyor axes are in substantially perpendicular planes and a second position wherein said conveyor axes are substantially aligned, and means for moving said conveyors between said positions and locking said conveyors in the respective positions, said last means comprising:

mechanism having a pivot axis intermediate opposite ends;
means respectively pivotally connecting opposite ends of said mechanism to said first and second conveyors at points spaced from said hinge; and
power means connected to said mechanism for moving said mechanism between 1. a first position in which the pivot axis is disposed beyond said pivotal connections and along a plane defined by said pivotal connection whereby to lock said conveyors in said first position and 2. a second position in which the pivot axis is disposed between and along a plane defined by said pivotal connections whereby to lock said conveyors in said second position.

8. A material handling apparatus as defined in claim 7, in which said mechanism comprises first and second sets of links disposed on opposite sides of said conveyors with each set comprising first and second links having adjacent ends interconnected to define said pivot axis and the free ends of said links pivotally connected to said conveyors at opposed sides of said conveyors.

9. A material handling apparatus as defined in claim 8, and wherein said mechanism produces a locking pressure between said conveyors when said mechanism is in said second position, the further improvement of adjustable means for varying the effective length of said first links whereby to vary said locking pressure.

10. In a harvesting material conveying apparatus including first and second conveyors having adjacent ends, and means pivotally interconnecting said ends for movement between an operating position and a storage position in which said second conveyor is disengaged from said first conveyor, the improvement of said means comprising a hinge disposed on one side of said conveyors, first and second pivot axis disposed on a side opposite said one side and adjacent said adjacent ends of said first and second conveyors respectively, first and second linkage means interconnecting opposite ends of said first and second pivot axis, said linkage means each including a first and a second link pivotally connected to each other at one end to define a third pivot axis each having a free end connected to said first and second pivot axis, respectively, fluid motor means including relatively movable elements with one element pivotally connected to said second conveyor and the other element connected to one of said links intermediate its ends thereof, said fluid motor means in coaction with said linkage means being operable to move said conveyors between said operating and storage positions in which said first, second and third pivot axis are disposed in a common plane to thereby lock said conveyors in said operating or said storage position.